United States Patent Office 3,197,505
Patented July 27, 1965

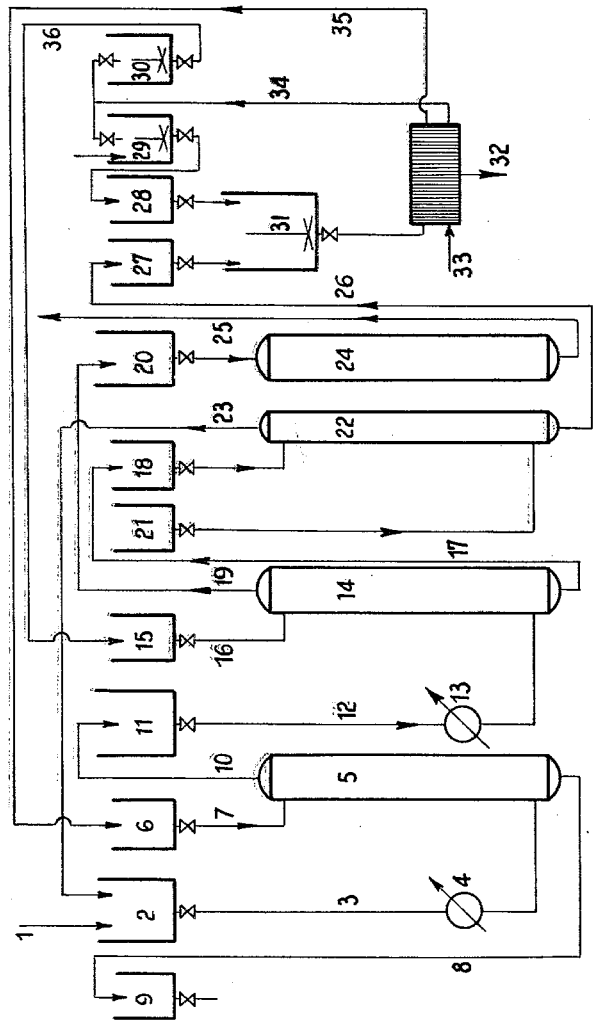

3,197,505
PROCESS FOR THE PREPARATION OF CYCLO-HEXANONEOXIME FROM THE OXIDATION PRODUCTS OF CYCLOHEXANE
Luciano Jori, 4 Via Freguglia, Milan, Italy
Filed Aug. 13, 1962, Ser. No. 216,541
Claims priority, application Italy, Sept. 16, 1961, 16,627/61
8 Claims. (Cl. 260—566)

It is known that the cyclohexane can be oxidized in liquid phase with oxygen or oxygen-containing gas, in the presence or in the absence of catalysts, under high pressure and temperature.

A reaction mixture is obtained, consisting of non-reacted cyclohexane, cyclohexanol, cyclohexanone, various acids, among which is adipic acid, and also esters of cyclohexanol with these same acids.

The ratios between the several components depend particularly upon the conversion percent. Generally this conversion is limited to values varying from 2 to 10% of the cyclohexane submitted to reaction. Under these conditions the main reaction products are the cyclohexanone and the cyclohexanol.

The common practice is that of submitting this mixture to an alkali treatment, particularly with caustic soda solutions, at elevated temperature, in order to saponify the esters and to remove the acid components.

Due to this treatment, a mixture is obtained consisting essentially of cyclohexanol, cyclohexanone and unaltered cyclohexane.

The separation of the cyclohexanone, widely used for preparing the caprolactam from this mixture, is one of the greater difficulties for the mass production of the cyclohexanone by this way and finally for production of the caprolactam.

Generally this separation is effected by fractional distillation, but this process is remarkably expensive, due to the large amounts of cyclohexane to be evaporated.

The applicant has now discovered that this separation can be easily and economically carried out by transforming the cyclohexanone present in the mixture into the corresponding oxime by an aqueous solution of hydroxylamine and extracting the cyclohexanoneoxime from the organic phase with an alkali aqueous solution. From the aqueous solution, the oxime can be reprecipitated by neutralization and separated by filtration.

According to this invention, the preparation of the oxime can be carried out at a temperature between 0° C., and the boiling temperature of the cyclohexane, and preferably between 40° C. and 60° C. The concentration of the base solution of hydroxylamine can vary between very wide limits having as sole limitation the need of not overcoming the solubility of the inorganic salt formed in the neutralisation. The ratio between the present cyclohexanone and the hydroxylamine can be stoichiometric, but it will be preferable to use a slight excess of hydroxylamine.

The extraction of the cyclohexanoneoxime formed in the first stage of the process can be carried out by an aqueous solution of an alkali, particularly caustic soda at a concentration of 20% by weight. It will be possible to use also lower or higher concentrations. The lower concentrations afford, however, a lower extraction yield while the higher concentrations are not advisable since the result obtained thereby will not be better than those obtainable by the indicated concentration. Also in this stage of the process the ratios between cyclohexanoneoxime and alkali can be stoichiometric, but preferably an excess of alkali will be used, corresponding to the excess of hydroxylamine used in the first stage.

The extraction will be preferably carried out at room temperature or lower, improving thereby remarkably the extraction yield.

The temperature also remarkably affects the amounts of cyclohexanol extracted from the alkali solution with the oxime. A lower temperature results in a lower extracted amount.

It is suitable to separate the cyclohexanol present in the alkali aqueous phase. This separation can be effected by extraction with cyclohexane at the room temperature or at the same temperature at which it exists in the aqueous phase.

The cyclohexane extracts contain substantially all the cyclohexanol and the cyclohexanone still present, and only a limited amount of oxime.

The amount of cyclohexane to be used in this operation will preferably correspond to the sum of the cyclohexanone and of the acids initially present in the mixture coming from the oxidation and will be united with said mixture at the inlet of the oxime preparation stage.

Thus the fresh cyclohexane will be substituted for the reacted cyclohexane, keeping unaltered the circulating liquid volumes.

The organic phase wherefrom the oxime has been extracted, still contains small amounts of the same oxime and must be purified before being re-used in the oxidizing process.

This purifying action can be easily carried out by ion exchange resins. Particularly suitable for this purpose are the strongly acid resins, the active group of which consists of an acid radical $SO_3H^+$.

After its passage on the resin the oxidation mixture is practically free from oxime and consists of cyclohexanol and non-reacted cyclohexane and forms therefore an optimum raw material for the oxidation process.

The precipitation of the cyclohexanoneoxime from its alkali solution can be obtained by any mineral acid, or by carbon dioxide or carbon dioxide containing gas.

However, it will be more convenient to utilize for this precipitation the same hydroxylamine salt, for instance the sulphate, obtaining thus the double purpose of separating the oxime and simultaneously preparing the base solution of hydroxylamine, forming the necessary base for the first stage of the process. Also the result will be attained of avoiding a loss of oxime such as will occur whether the mother liquors of the precipitation would not be reutilized.

The precipitated oxime will be washed with water and the washing will be utilized for preparing the alkali and hydroxylamine solution.

The so obtained oxime can be further purified by one of the conventional distillation or crystallization methods from a suitable solvent in order to obtain a product having a particular purity.

The process according to this invention can be suitably carried out in a continuous plant which will be described with reference to the attached drawing.

The mixture of the reaction products, coming directly from the oxidation and still hot is sent through the pipe 1, to the reservoir 2 and therefrom, through the pipe 3 and the heat exchanger 4 at the bottom of the packed column 5. By the meter 6 and the pipe 7 simultaneously the column 5 is fed in counterstream with an aqueous hydroxylamine solution. The exhausted aqueous phase outflowing from the column is sent through the pipe 8 to the reservoir 9.

This aqueous phase contains the inorganic salts coming from the neutralization of the hydroxylamine salt. Should the inorganic salt be sodium sulphate, this solution could be conveniently crystallized by cooling and the mother liquors, containing the excess of hydroxylamine and little amounts of oxime, reutilized for dissolving other hydroxylamine salt.

The organic phase, through the pipe 10 is sent to the metering vessel 11 and therefrom, through the pipe 12 and the heat exchanger 13 at the bottom of the packed column 14. Simultaneously the aqueous alkali solution is counterstream fed, said solution coming from the mixer 30 through the pipe 36, the metering device 15 and the pipe 16. The organic phase outflowing from the colum through the pipe 19 is sent to the metering vessel 20 and therefrom to the column 24 containing the ion exchange resin. The purified organic phase, outflowing from the column through the pipe 25 can be again utilized for the oxidation.

The aqueous phase outflowing from the column 14, said phase containing the oxime and little amounts of cyclohexanol and cyclohexanone, is sent through the pipe 17 to the metering device 18 which feeds the packed column 22. From the metering device 21 cyclohexane is supplied in an amount equalling that present under the form of cyclohexanone in the mixture coming from the oxidation.

The outflowing cyclohexane, which has extracted all cyclohexanol and a little amount of oxime, is united through the pipe 23 into the metering device 2 to that coming from the oxidation.

The aqueous phase, thus purified, is supplied, through the pipe 26 to the metering vessel 27 and therefrom continuously supplied to the mixer 31 simultaneously with a stoichiometric amount of an aqueous solution of hydroxylamine salt prepared within the mixer 29 with water coming from the washing of the oxime and sent to the mixer through the pipe 34.

The precipitated oxime is filtered by the filter 32. The mother liquors, consisting of a solution of base hydroxylamine saturated with oxime and containing the inorganic salt formed by neutralization of the alkali, are sent through the pipe 35 into the metering vessel 6 which feeds the column 5.

Through the pipe 33 is supplied to the filter the water for washing the oxime in such an amount as to be entirely utilized for the preparation of the solution of alkali and hydroxylamine salt, uniting as far as the latter is concerned to the waters coming from the crystallization of the exhausted aqueous phase outflowing from the column 5.

The cyclohexanone oxime discharged from the filter 32 will be then dried and purified, if the case may be, by distillation and crystallization from a suitable solvent, for instance petroleum ether.

*Example 1*

The preparation and the extraction of the oxime are effected starting from a mixture coming from the oxidation of cyclohexane with air in liquid phase and saponified with caustic soda.

The mixture containing 4.7% of cyclohexanol and 5.1% cyclohexanone is supplied to the column 5 with a feed of 3700 grams/hour and at a temperature of 50° C.

The column, made of stainless steel has a volume of 11 liters and is packed with Raschig rings. In counterstream a solution is fed, containing 8.3% hydroxylamine prepared as described later on. This solution is almost saturated with sodium sulphate at 20° C. The feed is 865 grams/hour corresponding to a 10% excess. The composition of the two phases outflowing from the column is as follows:

Organic phase: 4.6% cyclohexanol, 0.10% cyclohexanone and 5.7 cyclohexanoneoxime.

Aqueous phase: 0.6 hydroxylamine, 0.1% cyclohexanol and 0.6% oxime.

The organic phase is supplied to the column 14, the embodiment of which is equal to that of the column 5, at the temperature of 20° C. with a feed of 3700 grams/hour. In counterstream a 20% sodium hydrate solution is fed; the feed of said solution is 415 grams/hour and the preparation will be described later on.

The organic phase outflowing from said column has the composition as follows: 4.2% cyclohexanol, 0.10% cyclohexanone, 0.2% oxime and is collected in the metering vessel 20 and fed therefrom in an amount of 3700 grams/hour, at the column 24 containing 5 liters of anhydrous ion exchange resin "Dowex 50." At the outlet from this column, the organic phase is practically free from oxime.

The aqueous phase outflowing from the column 14, containing 27.5% oxime and 4% cyclohexanol is washed in counterstream in the column 22 with 190 grams/hour of cyclohexane. The volume of the column is 1 liter and is packed with Raschig rings.

This treatment reduces the cyclohexanol contents of the aqueous phase down to 0.3%.

From the so purified aqueous phase the oxime is continuously precipitated in the mixer 31 with 430 grams/hour of a 39% solution of hydroxylamine sulphate prepared with waters coming to the extent of 70% from the oxime washing and of 30% from the recovery of the exhausted hydroxylamine solution outflowing from the column 5 after the separation by crystallization of the sodium sulphate.

The precipitated oxime is separated from the mother liquors by the filter 32 and washer with 520 grams/hour of water which is utilized to the amount of 200 grams/hour for dissolving the hydroxylamine sulphate, while the remainder is sent to the mixer 30 to prepare the 20% solution of caustic soda.

The mother liquors, consisting of an 8.3% solution of base hydroxylamine, besides the sodium sulphate are recycled into the metering vessel 6 for supplying the column 5.

The obtained oxime is dried and crystallized from petroleum ether.

The melting point after crystallization is 87° C.

The yield of the oxime in the column 5 is 98% and the extraction yield of the formed oxime is practically quantitative.

The loss of cyclohexanol in the non-recovered portion of the aqueous phase outflowing from the column 5 does not overcome 2% of the present cyclohexanol.

The "Dowex 50" resin is suitably regenerated by a solution of 70% sulphuric acid wherefrom the oxime is separately precipitated to neutralize by an alkali. The resin is then washed with distilled water and dried in air stream before being reused.

*Example II*

The preparation and the extraction of the oxime has been repeated under the conditions of the Example 1 using hydroxylamine chlorhydrate instead of sulphate with equivalently good results.

The present invention has been illustrated and described in some preferred embodiments, being however understood that executive changes might be practically adopted without departing from the scope of the present invention.

I claim:

1. A process for producing cyclohexanoneoxime from cyclohexanone contained in a mixture consisting essentially of cyclohexanol, cyclohexanone and cyclohexane, said mixture being obtained from the oxidation of cyclohexane with oxygen, which comprises (1) mixing said mixture with at least a stoichiometric amount of hydroxylamine, (2) mixing the so-formed reaction mixture with an alkali aqueous solution at less than room temperature, thereby forming an alkali aqueous phase containing the major portion of the cyclohexanoneoxime and an organic phase containing a minor portion of the cyclohexanoneoxime, (3) passing said organic phase through a sulphonic acidic ion exchange resin, thereby removing the minor portion of cyclohexanoneoxime, and (4) mixing said alkali aqueous phase obtained in step (2) with cyclohexane, thereby extracting the cyclohexanol contained in said alkali aqueous phase and obtaining an alkali aqueous solution of cyclohexanoneoxime.

2. A process as claimed in claim 1 wherein in step (1) the hydroxylamine is added counter-current to the cyclohexanone mixture.

3. A process as claimed in claim 1 wherein in step (2) the aqueous alkaline solution is added counter-current to the reaction mixture.

4. A process as claimed in claim 1 wherein in step (4) the cyclohexane is added counter-current to the alkali aqueous phase.

5. A process as claimed in claim 1 wherein the cyclohexane containing the extracted cyclohexanol is recycled into step (2).

6. A process for producing cyclohexanoneoxime from cyclohexanone contained in a mixture consisting essentially of cyclohexanol, cyclohexanone and cyclohexane, said mixture being obtained from the oxidation of cyclohexane with oxygen, which comprises (1) mixing said mixture with at least a stoichiometric amount of hydroxylamine, (2) mixing the so-formed reaction mixture with an alkali aqueous solution at less than room temperature, thereby forming an alkali aqueous phase containing the major portion of the cyclohexanoneoxime and an organic phase containing a minor portion of the cyclohexanoneoxime, (3) passing said organic phase through a sulphonic acidic ion exchange resin, thereby removing the minor portion of cyclohexanoneoxime, (4) mixing said alkali aqueous phase obtained in step (2) with cyclohexane, thereby extracting the cyclohexanol contained in said alkali aqueous phase and obtaining an alkali aqueous solution of cyclohexanoneoxime, and (5) mixing said alkali aqueous solution of cyclohexanoneoxime with a member selected from the group consisting of a mineral acid, $CO_2$ and salt of hydroxylamine, thereby precipitating the cyclohexanoneoxime.

7. A process as claimed in claim 6 wherein in step (5) hydroxylamine chlorohydrate is mixed with the aqueous solution of cyclohexanoneoxime.

8. A process as claimed in claim 6 wherein in step (5) hydroxylamine sulphate is mixed with the aqueous solution of cyclohexanoneoxime.

References Cited by the Examiner
UNITED STATES PATENTS

| | | | |
|---|---|---|---|
| 2,237,365 | 4/41 | Schlack | 260—566 |
| 2,822,393 | 2/58 | Nicolaisen et al. | 260—566 |

OTHER REFERENCES

Schmidt et al., C.A., vol. 55, pp. 3463–3464 (1961).

CHARLES B. PARKER, *Primary Examiner.*

JOSEPH P. BRUST, *Examiner.*